(12) United States Patent
Egan et al.

(10) Patent No.: US 7,740,031 B2
(45) Date of Patent: Jun. 22, 2010

(54) SYSTEM FOR BLENDING AND COMPRESSING GASES

(75) Inventors: Gregory J. Egan, Littleton, CO (US); Justin Fulton, Fort Collins, CO (US); Roger W. Marmaro, Chandler, AZ (US); Franklin Earl Lynch, Balley, CO (US)

(73) Assignee: Eden Innovations Ltd., Dublin (IE)

( * ) Notice: Subject to any disclaimer, the term of this patent is extended or adjusted under 35 U.S.C. 154(b) by 488 days.

(21) Appl. No.: 11/411,766

(22) Filed: Apr. 26, 2006

(65) Prior Publication Data

US 2006/0263283 A1 Nov. 23, 2006

(30) Foreign Application Priority Data

Apr. 26, 2005 (AU) .............................. 2005902083

(51) Int. Cl.
 *B65B 1/04* (2006.01)
(52) U.S. Cl. .................. 141/105; 137/101.19; 137/897
(58) Field of Classification Search ...................... 141/9, 141/94, 95, 100, 101–105, 192, 198; 137/98, 137/101.19, 897
See application file for complete search history.

(56) References Cited

U.S. PATENT DOCUMENTS

| | | | | |
|---|---|---|---|---|
| 3,762,428 | A | * | 10/1973 | Beck et al. ................ 137/88 |
| 4,480,654 | A | * | 11/1984 | Firey .................... 137/119.09 |
| 4,520,763 | A | | 6/1985 | Lynch et al. |
| 4,526,771 | A | * | 7/1985 | Forbush et al. .............. 423/543 |
| 4,559,133 | A | | 12/1985 | Siegfried et al. |
| 4,608,830 | A | | 9/1986 | Peschka et al. |
| 5,139,002 | A | | 8/1992 | Lynch et al. |
| 5,183,011 | A | | 2/1993 | Fuji et al. |
| 5,512,787 | A | | 4/1996 | Dederick |
| 5,516,967 | A | | 5/1996 | Pandey et al. |
| 5,529,484 | A | | 6/1996 | Moard et al. |
| 5,558,783 | A | | 9/1996 | McGuinness |
| 5,660,602 | A | | 8/1997 | Collier, Jr. et al. |
| 5,666,923 | A | | 9/1997 | Collier, Jr. et al. |

(Continued)

OTHER PUBLICATIONS

U.S. Appl. No. 11/273,397, filed Nov. 14, 2005, Rudland et al.

(Continued)

*Primary Examiner*—Gregory L Huson
*Assistant Examiner*—Jason K Niesz
(74) *Attorney, Agent, or Firm*—Stephen A. Gratton

(57) ABSTRACT

A gas blending and compressing system includes a blender having a blending chamber configured to blend two or more separate gases into a blended gas, a compressor configured to compress the blended gas to a selected pressure, and a control system configured to sense operational parameters of the blender and the compressor, to sense one or more properties of the blended gas and to control the operation of the blender and the compressor to maintain the quality of the blended gas. A method for blending and compressing two or more gases includes the steps of: blending the separate gases into a blended gas using the blender; compressing the blended gas using the compressor; and matching a constant flow through the compressor to a selected minimum flow dependent on nominal operating parameters of the compressor. Alternate embodiment systems and methods blend separate gases at high pressure without using a compressor. Various principles are applied at high pressure including choked flow and partial pressure blending.

15 Claims, 7 Drawing Sheets

U.S. PATENT DOCUMENTS

| | | | |
|---|---|---|---|
| 5,687,776 | A | 11/1997 | Forgash et al. |
| 5,705,771 | A | 1/1998 | Flynn et al. |
| 5,771,857 | A | 6/1998 | Willi |
| 5,787,864 | A | 8/1998 | Collier, Jr. et al. |
| 5,804,760 | A | 9/1998 | Flynn |
| 5,826,632 | A * | 10/1998 | Micke et al. .................... 141/9 |
| 5,868,133 | A * | 2/1999 | DeVries et al. ......... 128/204.21 |
| 5,887,567 | A | 3/1999 | White et al. |
| 6,058,713 | A | 5/2000 | Bowen et al. |
| 6,105,631 | A * | 8/2000 | Pittroff et al. .................... 141/3 |
| 6,152,192 | A | 11/2000 | Klotz et al. |
| 6,273,076 | B1 | 8/2001 | Beck et al. |
| 6,311,648 | B1 | 11/2001 | Larocque |
| 6,327,856 | B1 | 12/2001 | Iwabuchi et al. |
| 6,378,308 | B1 | 4/2002 | Pfluger |
| 6,508,209 | B1 | 1/2003 | Collier, Jr. |
| 6,651,623 | B1 | 11/2003 | Tang et al. |
| 6,739,125 | B1 | 5/2004 | Mulligan |
| 6,745,613 | B2 | 6/2004 | Rendahl et al. |
| 6,758,593 | B1 | 7/2004 | Terentiev |
| 6,779,337 | B2 | 8/2004 | Tang et al. |
| 6,823,852 | B2 | 11/2004 | Collier, Jr. |
| 6,827,084 | B2 * | 12/2004 | Grubb, Jr. ............... 128/204.22 |
| 6,834,508 | B2 | 12/2004 | Bradley |
| 6,901,952 | B2 | 6/2005 | Girouard |
| 6,951,765 | B1 | 10/2005 | Gopinath et al. |
| 7,111,452 | B2 | 9/2006 | Miyoshi et al. |
| 7,168,464 | B2 * | 1/2007 | Diggins ....................... 141/105 |
| 7,201,159 | B2 | 4/2007 | Veinotte |
| 7,240,641 | B2 | 7/2007 | Balan et al. |
| 7,497,191 | B2 | 3/2009 | Fulton et al. |
| 2003/0051486 | A1 | 3/2003 | Ursan et al. |
| 2003/0177785 | A1 | 9/2003 | Kimble et al. |
| 2003/0209211 | A1 | 11/2003 | Collier, Jr. |
| 2004/0237512 | A1 | 12/2004 | Tang et al. |
| 2004/0244280 | A1 | 12/2004 | Waynick |
| 2005/0016507 | A1 | 1/2005 | Tamol, Sr. |
| 2005/0027592 | A1 | 2/2005 | Pettigrew et al. |
| 2005/0031918 | A1 | 2/2005 | Barker et al. |
| 2005/0188683 | A1 | 9/2005 | Miyoshi et al. |
| 2005/0224045 | A1 | 10/2005 | Kuzuyama |
| 2006/0263283 | A1 | 11/2006 | Egan et al. |
| 2007/0039598 | A1 | 2/2007 | Wakayama et al. |
| 2007/0108096 | A1 | 5/2007 | Egan et al. |
| 2007/0181083 | A1 | 8/2007 | Fulton et al. |
| 2007/0277438 | A1 | 12/2007 | Lynch et al. |
| 2008/0216774 | A1 | 9/2008 | Fulton et al. |

OTHER PUBLICATIONS

U.S. Appl. No. 11/348,193, filed Feb. 6, 2006, Fulton et al.
Basye, Leon et al, "Hydrogen Production Costs-A Survey", Dec. 4, 1997, pp. 1-10, Sentech, Inc., Bethesda, MD.
Office Action dated Sep. 25, 2007 from U.S. Appl. No. 11/348,193.
Office Action dated Mar. 21, 2008 from U.S. Appl. No. 11/348,193.
Office Action dated May 23, 2008 from U.S. Appl. No. 11/348,193.
PCT Search Report and Written Opinion in International Application No. PCT/US06/15663 dated Apr. 27, 2007.
Office Action dated Jun. 9, 2009 from U.S. Appl. No. 12/120,438, pp. 1-10.

* cited by examiner

SYSTEM FOR BLENDING AND COMPRESSING GASES

CROSS REFERENCE TO RELATED APPLICATIONS

This application is related to Ser. No. 11/348,193, filed Feb. 6, 2006, U.S. Pat. No. 7,497,191 B2, and to Ser. No. 12/120,438, filed May 4, 2008, Publication No. 2008/0216774 A1.

FIELD

This application relates generally to blending and compressing two or more gases wherein the rate of blending matches the rate of compressing the gases. This application also relates to high pressure blending wherein compressing is eliminated.

BACKGROUND

In many applications, for instance in the generation of an alternative fuel, it is important to blend two or more gases in a constant ratio prior to compression. If the rate of blending falls behind the intake rate of the compressor, the intake pressure will fall. Safety is an issue in the situation where the blended gases are fuels since if the intake pressure falls below atmospheric pressure, air may be sucked into the fuel gas mixture. Therefore compressor control systems generally include a low intake pressure limit switch that stops the compressor if the intake pressure is too low.

Conversely, if the rate of blending exceeds the intake rate of the compressor, the intake pressure will rise. If the pressure of the blended gas at the intake is too high excessive mechanical stress can be placed on the compressor. Therefore compressor control systems generally include a high intake pressure limit switch that stops the compressor if the intake pressure is too high. The reliable operation of a gas blending and compression system depends upon striking a balance between blender production and compressor consumption.

The gas blending and compressing system to be described blends gases in a constant ratio while simultaneously matching blender production with compressor consumption. However, the foregoing examples of the related art and limitations related therewith, are intended to be illustrative and not exclusive. Other limitations of the related art will become apparent to those of skill in the art upon a reading of the specification and a study of the drawings.

SUMMARY

A low pressure gas blending and compressing system includes a blender having a blending chamber configured to blend two or more separate gases into a blended gas, and a compressor configured to compress the blended gas to a selected pressure. The blender can include separate inlet chambers configured to receive the separate gases, and a blending chamber in flow communication with the inlet chambers configured to blend the gases into the blended gas.

In addition to the blender and the compressor, the low pressure gas blending and compressing system also includes a control system configured to sense operational parameters of the blender and the compressor, to sense one or more properties of the blended gas (e.g., thermal conductivity, composition, etc), and to control the operation of the blender and the compressor to maintain the quality of the blended gas.

The control system can be configured such that by varying a blender output pressure to the compressor, a substantially constant flow rate can be provided through the compressor. Stated differently, a compressor intake pressure can be controlled by varying the output of the blender to maintain a constant flow rate through the compressor. In addition, to maintain sonic flow and counteract the effect of pressure pulsations, the pressure of the separate gases supplied to the blender can be set to maintain a predetermined minimum pressure differential, relative to a downstream pressure. Additionally, in order to maintain a minimum upstream/downstream pressure differential between the inlet chambers and the mixing chamber, the blender can include choking devices between the chambers, such as a sonic orifices, sonic nozzles, adjustable sonic nozzles, or metering valves.

The control system can also include a variety of sensors configured to monitor operating parameters of the blender and the compressor. For example, the nominal operating parameters of the compressor can include a maximum operating temperature, a maximum output pressure, a minimum intake pressure and a maximum intake pressure. During steady state operation of the system, the minimum flow rate of the compressor, at its maximum operating temperature and near its maximum output pressure, can be matched to a constant output flow from the blender. The blender output pressure, at this condition, will be near the compressor's maximum intake pressure. At any lower operating temperature and/or lower output pressure, the compressor flow will tend to increase. Since the blender flow is constant, the compressor intake pressure will fall, reducing compressor flow to restore the balance between blender flow and compressor flow. In order to maintain these flow conditions, the control system can include a sensor configured to sense a compressor intake pressure and to determine when the intake pressure of the blended gas approaches the compressor's minimum intake pressure. A high intake pressure limit switch and a low intake pressure limit switch can also be incorporated into the control system as well.

The control system can further include a pneumatically operated valve associated with each pressure regulator. Each valve can be switchable between an open position in which each gas is supplied to it's associated inlet chamber of the blender, and a closed position in which the gas flow is restricted should the quality of the blended gas be below a predetermined level. The control system can also be configured to operate adjustable choking devices, such as area adjustable sonic nozzles, to adjust flow pressures and a blend ratio of the separate gases.

The control system can also include a feedback control system configured to determine when the blend ratio of the separate gases in the blended gas is outside of a predetermined range. In response, the feedback control system can be operable to vary the supply pressure of at least one of the gases, and/or the diameter of at least one of the sonic orifices. The control system can further include a temperature regulator, such as a heat exchanger, configured to regulate and substantially equalize the temperatures of the separate gases prior to blending, and pressure regulators configured to regulate the pressures of the gases.

The control system can also include a mixer configured to mix the blended gas. The mixer can include a mixing chamber with an inlet configured to receive the blended gas, and an outlet configured to output the blended and mixed gas to the compressor. The mixing chamber can also include a plurality of gas agitating elements, such as baffle plates configured to facilitate mixing of the blended gas. The diameter of the mixing chamber, the diameters of the inlet and outlet of the mixing chamber, and the spacing and configuration of baffle plates can be configured to ensure turbulent flow through the mixing chamber, and to minimise the pressure drop between the inlet and outlet of the mixing chamber.

The low pressure gas blending and compressing system can also include a storage system, such as a high pressure receptacle, or a cascade of receptacles, configured to store the blended and compressed gas. Alternately, the blended and compressed gases can be supplied directly to a vehicle having an engine configured to burn the blended and compressed gas as a fuel.

The low pressure gas blending and compressing system outlined above can be constructed for operation at relatively low pressures. An alternate embodiment high pressure system is constructed to blend the separate gases at relatively high pressures but without subsequent compression. The high pressure gas blending system includes actively controlled pressure regulators, and/or actively controlled choking devices for providing a predetermined blend ratio of the separate gases at a high pressure to a mixer.

An alternate embodiment partial pressure gas blending system can be constructed to blend the separate gases using partial pressures. The partial pressure gas blending system includes a control system which uses known vehicle tank temperatures, partial pressures and real gas properties to calculate and confirm a predetermined blend ratio of the separate gases.

A low pressure method for blending and compressing two or more gases includes the steps of: providing a blender and a compressor. In the illustrative embodiment the blender includes at least two separate inlet chambers and a blending chamber in flow communication with the inlet chambers via choking devices; supplying at least two separate gases to the inlet chambers. The low pressure method also includes the steps of blending the separate gases into a blended gas using the blender; and then compressing the blended gas using the compressor.

The low pressure method can further include the step of setting the pressure of the gas in each inlet chamber to maintain a predetermined pressure differential relative to the pressure downstream from the choking devices to counteract the effect of pressure pulsations. With the temperatures of the gases in the inlet chambers being approximately equal, the method can further include the step of selecting the relative sizes of the choking devices, and selecting the pressures of the gases upstream of the choking device to fix the blend ratio of the gases in the blended gas.

The low pressure method can further include the step of matching a constant flow through the compressor to a selected minimum flow dependent on nominal operating parameters of the compressor. For example, during the blending step, the blender can be operated such that a constant flow from the blender matches the minimum flow of the compressor, at its maximum operating temperature and near its maximum output pressure. The blender output pressure, at this condition, will be near the compressor's maximum intake pressure. At any lower operating temperature and/or lower output pressure, the compressor flow will tend to increase. Since the blender flow is constant, the compressor intake pressure will fall, reducing compressor flow to restore balance between blender flow and compressor flow.

The low pressure method can further include the step of sensing the pressure of the blended gas at the compressor intake, and determining when the intake pressure of the blended gas falls outside of the compressor's nominal operating parameters. If the intake pressure is determined to be approaching a minimum intake pressure of the compressor, the method can further include the step of supplementing a flow of blended gas at the compressor intake with previously blended and compressed gas to maintain the pressure at the compressor intake above the minimum intake pressure.

The low pressure method can further include the step of regulating the temperature and pressure of the separate gases, and storing the blended and compressed gas. In addition, the low pressure method can include the step of determining the quality of the blended gas by measuring one or more properties of the blended gas. The step of determining the quality of the blended gas can also include the step of mixing the blended gas to ensure turbulent flow. The low pressure method can also include the step of regulating the flow of the separate gases into the blender should the quality of the blended gas be below a predetermined level optionally, the low pressure method can include the step of determining if a ratio of the separate gases in the blended gas is outside of a predetermined range, and then varying the supply of at least one of the separate gases and/or the diameter of at least one of the choking devices responsive to the determining step.

A high pressure method for blending two or more gases includes the steps of: providing separate gases at a high pressure; controlling either a pressure, a flow rate (or both), of at least one of the separate gases to provide a selected blend ratio; and then mixing the separate gases into a blended gas having the selected blend ratio.

A partial pressure method for blending two or more gases includes the steps of: providing separate gases at high pressures; providing a control system and a receptacle; and then filling the receptacle with the separate gases using the control system to calculate known vehicle tank temperatures, partial pressures and real gas properties to achieve a predetermined blend ratio of the separate gases.

BRIEF DESCRIPTION OF DRAWINGS

Exemplary embodiments are illustrated in the referenced figures of the drawings. It is intended that the embodiments and the figures disclosed herein are to be considered illustrative rather than limiting.

DETAILED DESCRIPTION

As used herein low pressure means a pressure between about 0.1 MPa (Pascals) to 1.0 MPa (Pascals). High pressure means a pressure between about 10 MPa (Pascals) to 100 MPa (Pascals).

Figure 1:
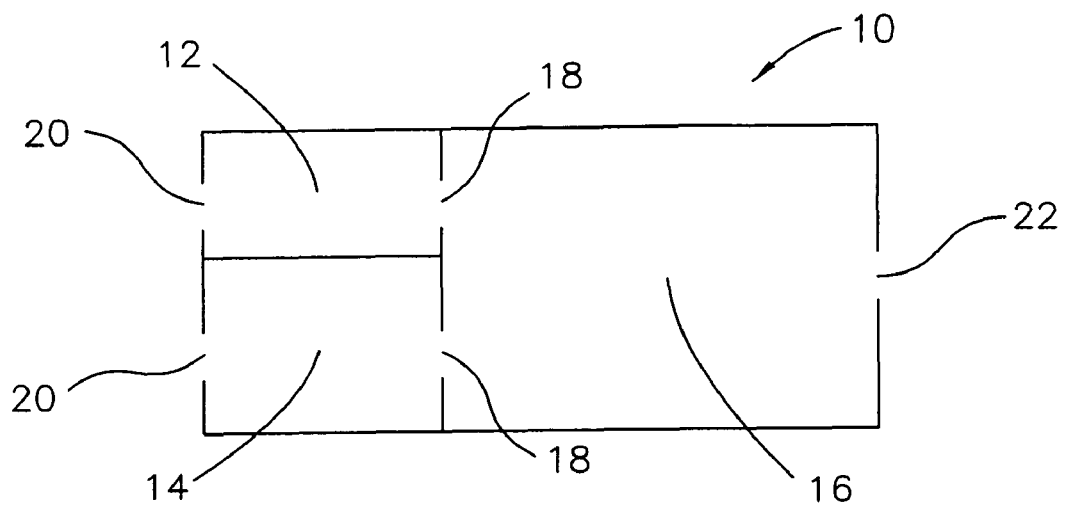
FIG. 1 is a schematic illustration of a gas blender.

Referring to FIG. 1, a gas blender 10 includes a first inlet chamber 12, a second inlet chamber 14 and a blending chamber 16. Regulated supplies of the gases to be mixed enter the inlet chambers 12 and 14 through inlet openings 20, and the blended gas exits the blending chamber 16 through an outlet opening 22.

In the illustrative embodiment, two gases are being blended to produce an alternative fuel. However, it is to be understood that the gas blender 10 can be configured to blend any number of gases (e.g., three, four, five etc.) to produce any type of gas mixture.

Also in the illustrative embodiment, the first inlet chamber 12 receives hydrogen gas, the second inlet chamber 14 receives natural gas (methane), and the blended gas comprises HYTHANE. The prefix "Hy" in HYTHANE is taken from hydrogen. The suffix "thane" in HYTHANE is taken from methane, which is the primary constituent of natural gas. HYTHANE is a registered trademark of Brehon Energy PLC. HYTHANE typically contains about 5% to 7% hydrogen by energy. Natural gas is typically about 90+% methane, along with small amounts of ethane, propane, higher hydrocarbons, and "inerts" like carbon dioxide or nitrogen.

Each inlet chamber 12, 14 communicates with the blending chamber 16 via a choking device 18. The choking devices 18 can have any desired configuration, which is selected to achieve sonic gas flow, a substantially constant mass flow rate and a minimum upstream/downstream pressure differential. However, in addition to being dependent on the configuration of the choking devices 18, these conditions will also be dependent on the temperature and pressure in the inlet chambers 12, 14.

The choking devices 18 can comprise sonic orifices, sonic nozzles, adjustable area sonic nozzles or metering valves. For example, each choking device 18 can comprise a hole in a flat plate having fixed dimensions and geometric shape (e.g., circular, square or rectangular). As another alternative, each choking device 18 can comprise an opening with a radiused or tapered entrance contour similar to a rocket nozzle. As yet another alternative, each choking device 18 can comprise an adjustable sonic nozzle having a nozzle area that can be actively controlled using electronic signals. As will be further explained, with an adjustable sonic nozzle, the flow rate through the choking devices 18 can be controlled as a function of various operational parameters. As yet another alternative, each choking device 18 can comprise a metering valve, which is either manually or electronically adjustable to provide a desired flow rate.

Figure 2:
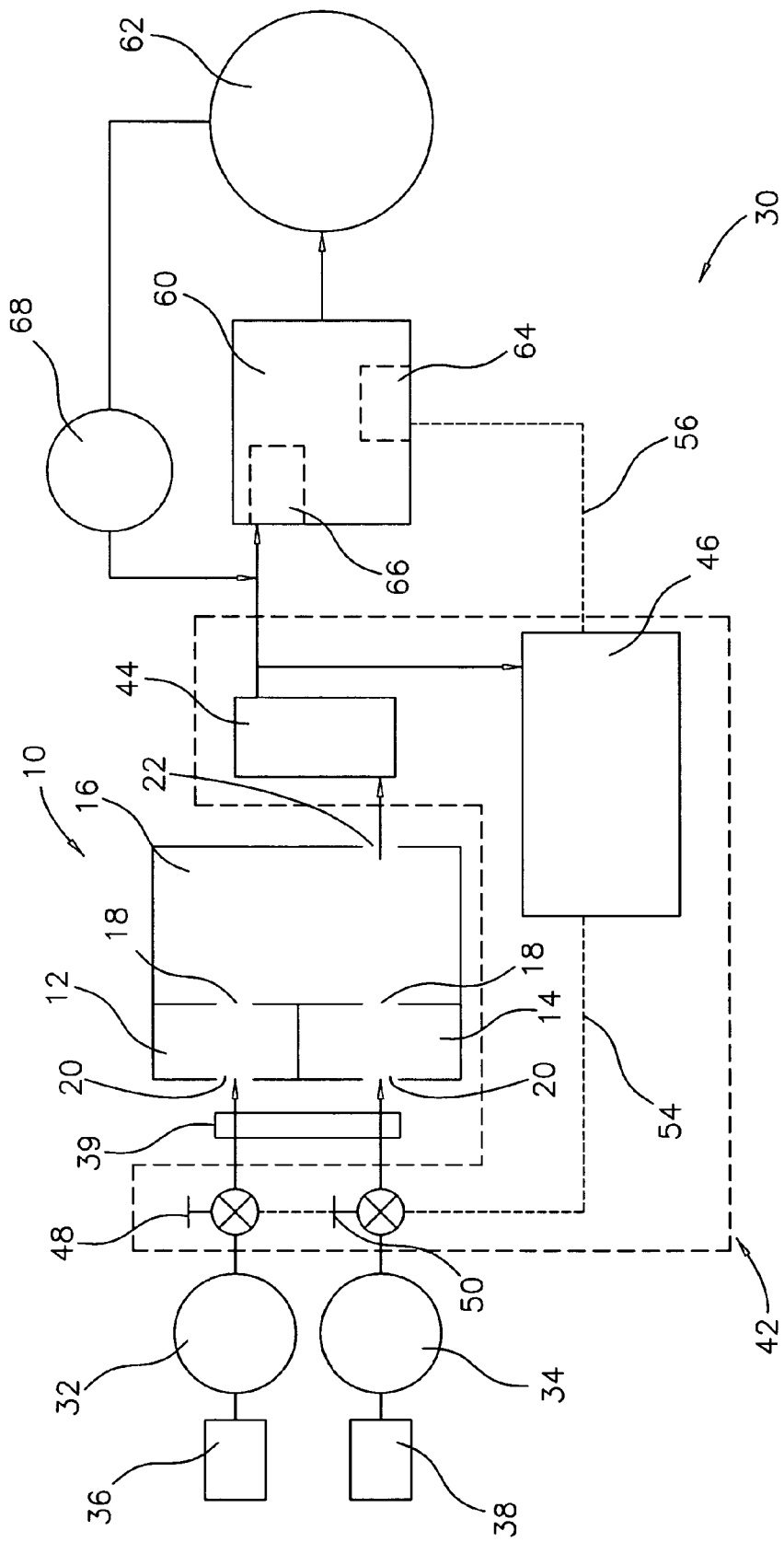
FIG. 2 is a schematic illustration of a gas blending and compressing system incorporating the blender illustrated in FIG. 1.

Referring to FIG. 2, a low pressure gas blending and compressing system 30 includes the blender 10 as previously described and a compressor 60 in flow communication with the blender 10. The compressor 60 is configured to compress the blended gas produced by the blender 10 to a selected pressure.

As shown in FIG. 2, the system 30 also includes a first pressure regulator 32 in flow communication with the first inlet chamber 12 of the blender 10, and a second pressure regulator 34 in flow communication with the second inlet chamber 14 of the blender 10. In addition, the first pressure regulator 32 is in flow communication with a supply of hydrogen gas 36, and the second pressure regulator 34 is in flow communication with a supply of natural gas 38. The pressure regulators 32, 34 are configured to supply the hydrogen gas 36 and the natural gas 38 to the blender 10 at selected pressures. In addition, the pressure regulators can comprise active devices controlled by electronic signals.

Figure 3:
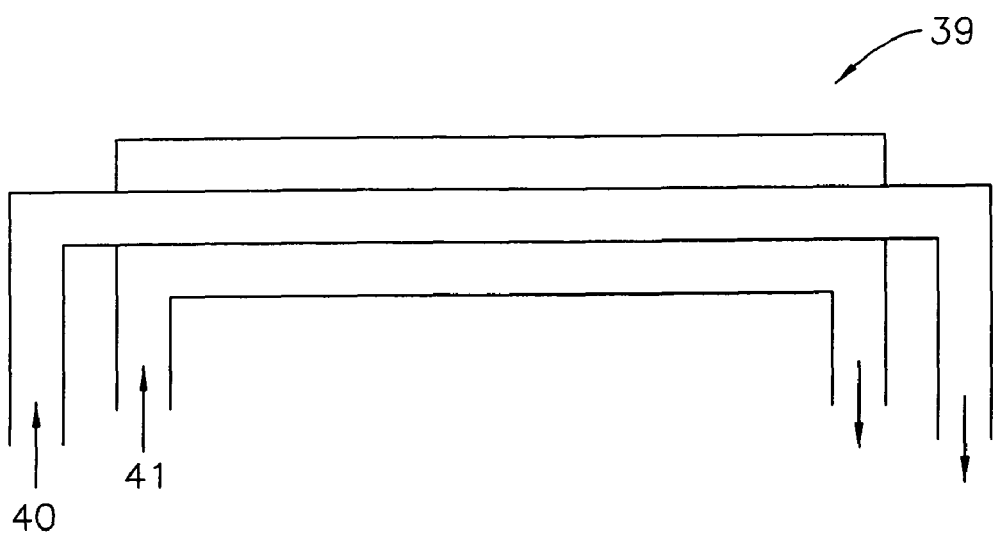
FIG. 3 is a schematic illustration of a heat exchanger of the system of FIG. 2.

As shown in FIG. 2, the system 30 also includes a coaxial heat exchanger 39 in fluid communication with the pressure regulators 32 and 34. The heat exchanger 39 is configured to substantially equalize the temperature of each gas to a selected temperature. The heat exchanger 39 is shown separately in FIG. 3. As shown in FIG. 3, the heat exchanger 39 includes a first cylindrical conduit 40, into which hydrogen gas is received, and a second cylindrical conduit 41, into which natural gas is received. In addition, the first cylindrical conduit 40 is positioned within the second cylindrical conduit 41.

As shown in FIG. 2, the system 30 also includes a control system 42, configured to sense operational parameters of the blender 10 and the compressor 60, to sense one or more properties of the blended gas (e.g., thermal conductivity, composition, etc), and to control the operation of the blender 10 and the compressor 60 to maintain the quality of the blended gas. The control system 42 can also include a mixer 44 in flow communication with the outlet 22 of the blender 10, a processing unit 46 in flow communication with the mixer 44, and a pair of pneumatically operated valves 48 and 50 in flow communication with the inlet chambers 12, 14 of the blender 10.

The system 30 also includes a high pressure storage system 62 in fluid communication with an outlet of the compressor 60. The storage system 62 is configured to store the blended gas for dispensing and use as a hydrogen enriched fuel in an alternative fueled vehicle (AFV). U.S. patent application Ser. No. 11/348,193 filed Feb. 6, 2006, entitled "System And Method For Producing, Dispensing, Using And Monitoring A Hydrogen Enriched Fuel", which is incorporated herein by reference, further describes the dispensing and use of the blended gas. Alternately, the storage system 62 can be eliminated and the blended and compressed gas can be supplied directly to the alternative fueled vehicle (AFV).

The blender 10 is constructed and operated such that a constant flow rate of the blended gas from the blender 10 matches the minimum flow rate required by the compressor 60 at its maximum operating temperature and near its maximum output pressure. The output pressure of the blender 10, at this flow rate, will be near maximum intake pressure of the compressor 60. At any lower operating temperature and/or lower output pressure, the compressor flow will tend to increase. Since the blender flow is constant, the compressor intake pressure will fall, reducing compressor flow to restore the balance between blender flow and compressor flow.

The relative sizes of the choking devices 18 and the upstream pressures of each gas, can be selected such that the ratio of the gases is fixed. This ratio is termed herein as the "blend ratio". Moreover, to maintain sonic flow and counteract the effect of pressure pulsations, the pressure of the gas in each inlet chamber 12, 14, can be set or adjusted by the pressure regulators 32 and 34 to maintain a predetermined critical pressure ratio, relative to the maximum pressure downstream from the choking devices 18. For example, the pressure of the gas in each inlet chamber 12, 14 can be twice the peak pressure downstream of the choking devices 18 for any choking device shape. Sonic nozzles are particularly efficient as choking devices requiring about 114% of downstream pressure in the inlet chambers 12, 14.

The control system 42 also includes a controller 64 and a sensor 66. The controller 64 can include a low intake pressure limit switch, a high intake pressure limit switch, a low temperature limit switch, a high temperature limit switch, a low oil pressure indicator and an oil level switch. The controller 64 can also include various computational and memory devices such as microprocessors, DRAMS (dynamic random access memories), SRAMS (static random access memories) and ASICS (application specific integrated circuits). In addition, the controller 64 can be configured to send and receive electronic signals to other elements of the control system 42, and to analyse and store information in digital form. The sensor 66 operates to sense an intake pressure of the blended gas at the intake to the compressor 60 and to determine when the intake pressure of the blended gas falls below a predetermined minimum level, and when the intake pressure of the blended gas exceeds a predetermined maximum level.

The system 30 can also include a feedback regulator 68 which operates in conjunction with the controller 64 and the sensor 66. When the sensor 66 senses that the pressure at the intake to the compressor 60 is approaching a pre-determined minimum level, the feedback regulator 68 supplements the flow of blended and mixed gas to the compressor intake with compressed gas from the storage tank 62 until the pressure at the intake to the compressor 60 exceeds the pre-determined minimum level. The action of the feedback regulator 68 in conjunction with sensor 66 aids in start-up operation of the compressor 60 in cold conditions.

Figure 4:
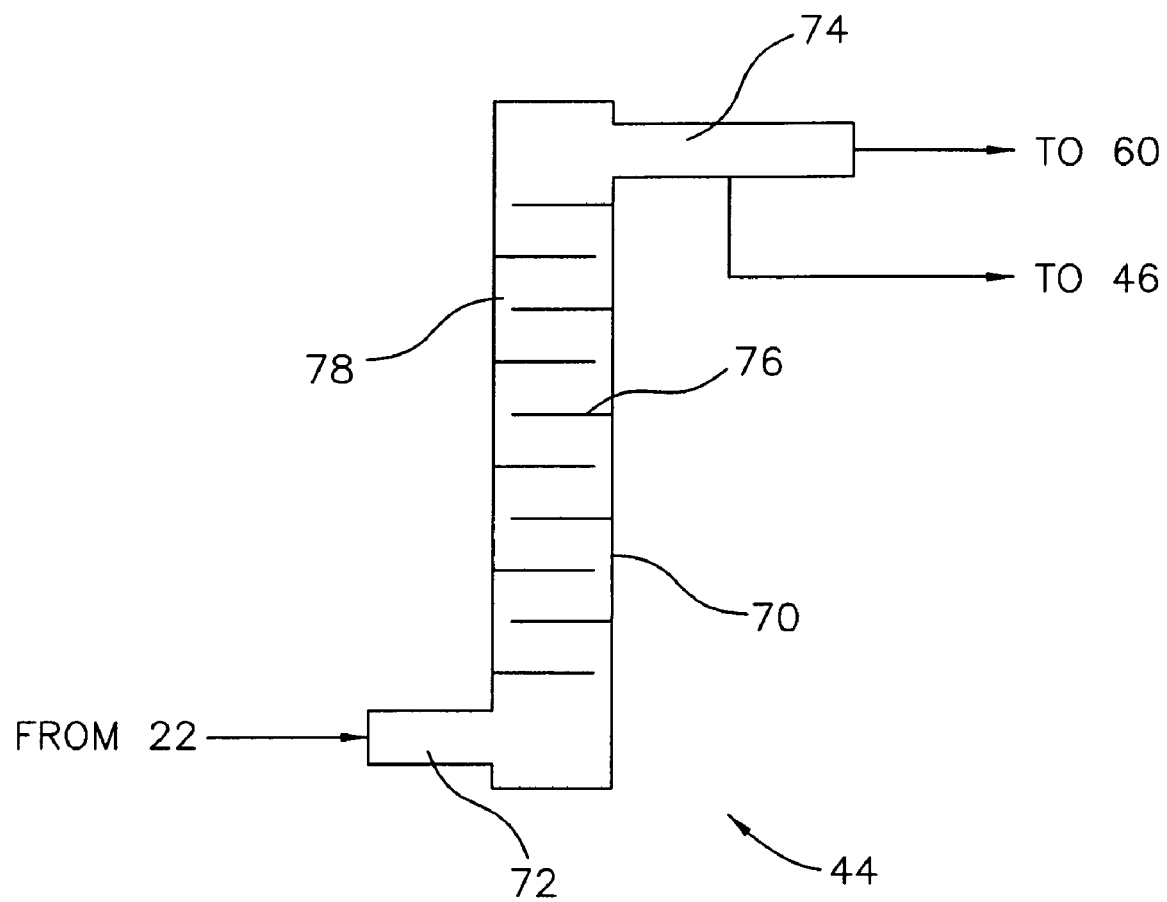
FIG. 4 is a schematic illustration of a mixing chamber of the system of FIG. 2.

Referring to FIG. 4, the mixer 44 is illustrated in more detail. The mixer 44 includes a cylindrical chamber 70 having an inlet pipe 72 configured to receive the blended gas from the outlet opening 22 of the blender 10. The mixer 44 also includes an outlet pipe 74 configured to output the blended, mixed gas to the compressor 60. Within the chamber 70 are a number of evenly spaced agitating elements in the form of baffle plates 76. Successive baffle plates 76 extend from alternating sides of the chamber 70, and each baffle plate 76 terminates short of the opposing side of the chamber 70 to create a plate opening 78. The spacing between baffle plates 76, the diameter of the inlet pipe 72, and the diameter of the outlet pipe 74 are designed so that the Reynolds number $Re_D$ is greater than or equal to 3000 to ensure that the flow of the blended gases through the mixing chamber 70 is turbulent.

In the illustrative embodiment, the cross sectional area of the inlet pipe 72 is substantially the same as the cross sectional area of the outlet pipe 74, and substantially the same as the cross sectional area of the plate openings 78. By maintaining the same cross sectional area in the plate openings 78 as in the inlet piping 72 and outlet piping 74, the pressure drop through the openings 78 can be substantially limited to gas momentum changes. The vertical orientation of the mixing chamber 70 is effective for mixing light gases, such as hydrogen gas, with denser gases such as natural gas.

A fraction of the mixed gas output from the outlet pipe 74 can be passed to the processing unit 46 where the accuracy of the blend of the hydrogen gas with the natural gas is verified. If the blended gas does not meet a pre-requisite standard, then the processing unit 46 shuts down the system 30 by discontinuing the supply of power 56 to the compressor 60, and discontinuing the supply of air 54 to the valves 48 and 50. Discontinuing the supply of air closes valves 48, 50 and stops the flow of the gases to the blender 10. The processing unit 46 can also be manually operated to override the compressor controller 64.

One advantage of the system 30 is that a balance can be achieved between the relatively constant blender flow and an otherwise variable compressor flow over a range of ambient temperatures, compressor temperatures, intake and outlet pressures. In addition, the system 30 is simple and relatively inexpensive to build, and can be operated at relatively low pressures. The preceding embodiment of the system 30 has therefore been termed as a low pressure embodiment. However, alternate embodiments of the system 30 can be operated at relatively high pressures.

High Pressure Embodiments

In addition to the technology disclosed in the previous low pressure embodiment, the following high pressure embodiments of the system 30 accomplish the same end result, a vehicle tank full of HYTHANE, in various ways using high pressure sources of hydrogen and CNG (compressed natural gas). One objective of the high pressure embodiments is to preserve the pressure energy of the high pressure hydrogen and CNG sources. Simply reducing pressure to the much lower pressures of typical hydrogen and natural gas sources, blending and recompressing according to the previous low pressure embodiment may not always be the most energy efficient method.

Pure hydrogen high pressure refueling equipment has been installed at locations that also have high pressure natural gas refueling equipment. In this case "refueling equipment" means compressors, storage tanks, dispensers, and associated gas handling apparatus. The following high pressure embodiments disclose various methods for blending HYTHANE from these high pressure sources of hydrogen and natural gas with minimal additional investment and minimal added compression energy costs.

There are three major differences for high pressure vs. low pressure blending. First, the natural gas (methane) source upstream of a choking device (e.g., choking devices 18—FIG. 2) does necessarily need to be regulated—it is generally kept at a pressure higher than the final desired fill pressure for a quicker refilling cycle, and the fuel filling process is automatically shut-off when the vehicle tank (or a HYTHANE storage cascade) is considered 'full'. Second, the hydrogen supply pressure must be regulated relative to the natural gas supply pressure (at a minimum, dome-loaded to follow the natural gas supply pressure). Third, either the hydrogen supply pressure or the hydrogen choking device must be actively controlled to account for the compressibility Z differences between methane and hydrogen as the supply pressures vary.

Figure 5:
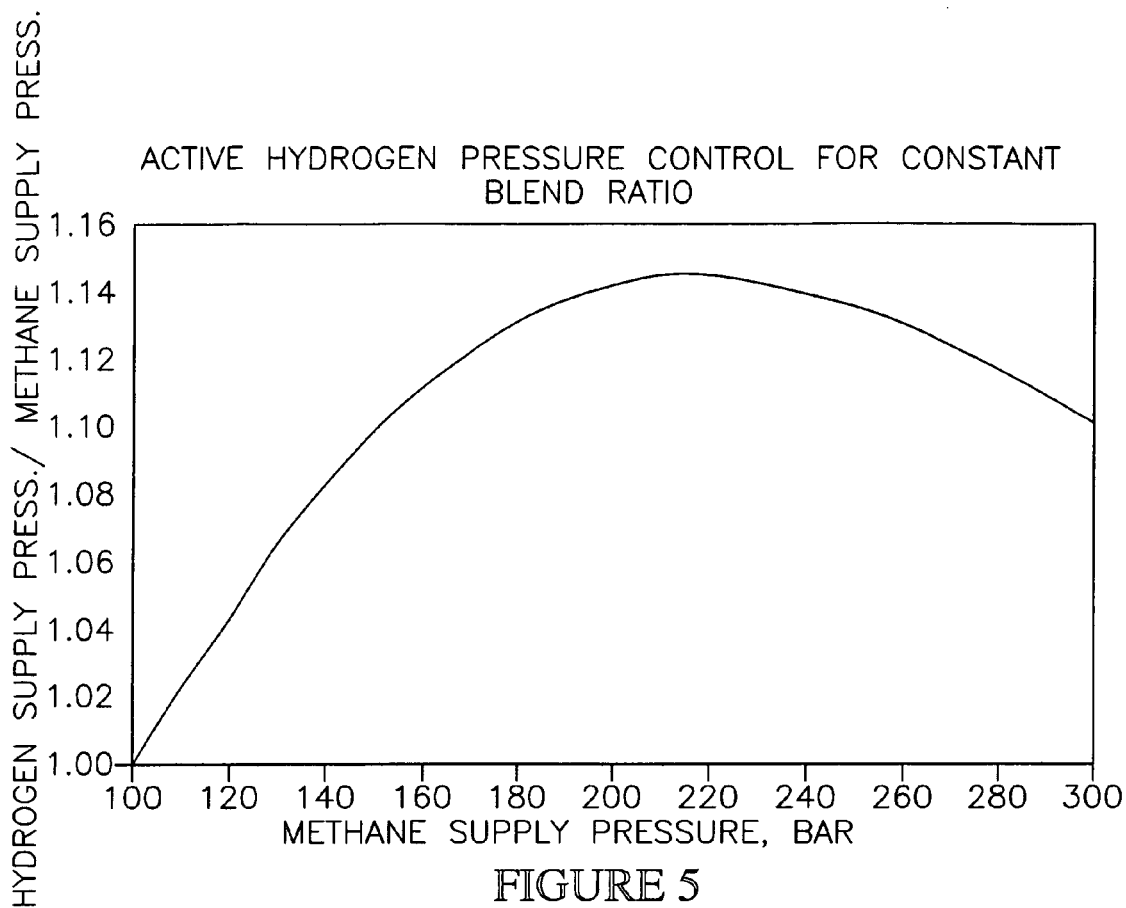
FIG. 5 is a graph illustrating active hydrogen pressure control for achieving a constant blend ratio.
Figure 6:
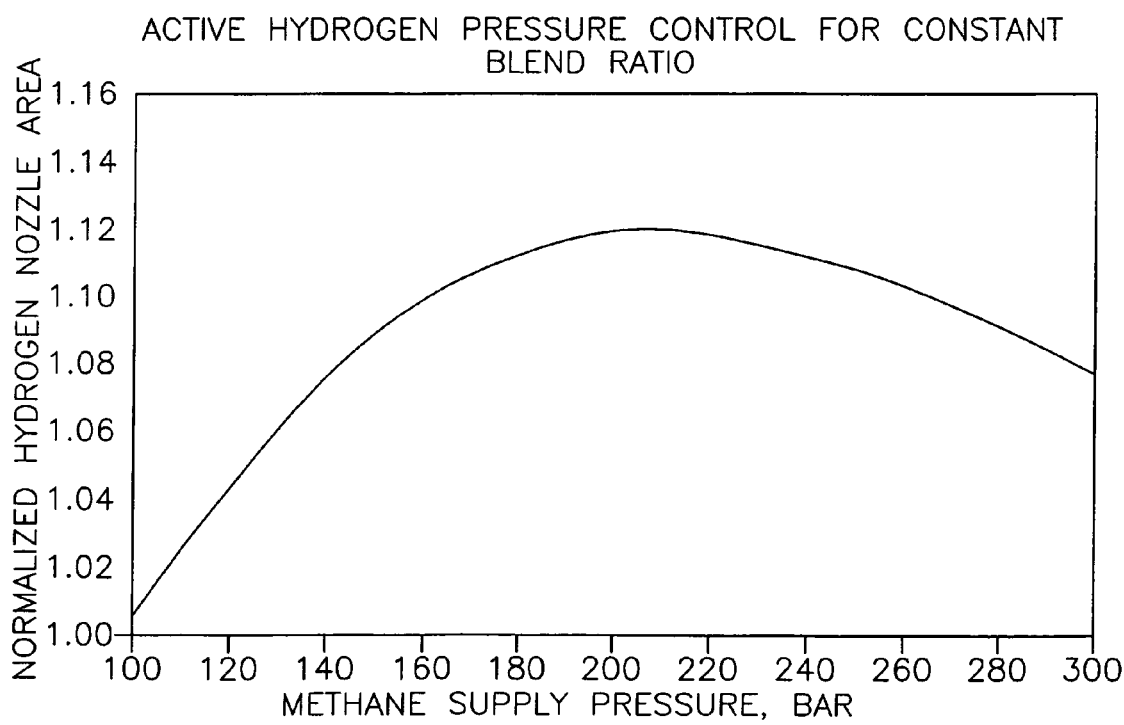
FIG. 6 is a graph illustrating active hydrogen nozzle control for achieving a constant blend ratio.

Example curves shown in FIGS. 5 and 6, illustrate the pressure ratio that must be maintained between the hydrogen and the methane. In FIG. 6, the choking devices (e.g., choking devices 18—FIG. 2) are in the form of sonic nozzles and the normalized hydrogen nozzle area vs. methane supply pressure is illustrated.

Figure 7:
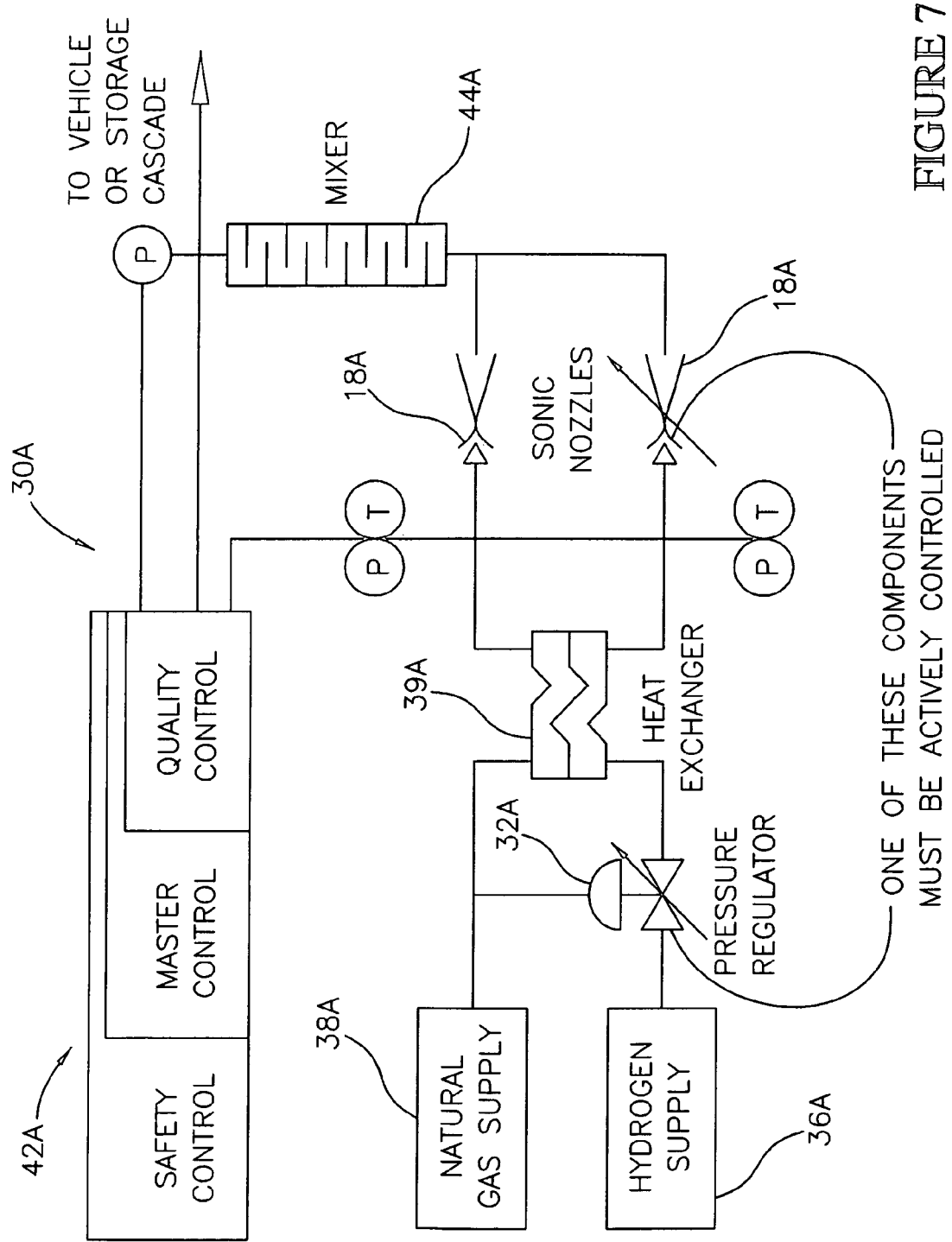
FIG. 7 is a schematic illustration of an alternate embodiment high pressure gas blending and compressing system.

FIG. 7 illustrates a high pressure system 30A in which the compressor 60 (FIG. 2) has been eliminated, and a mixer 44A replaces the blender 10 (FIG. 2). The mixer 44A can be constructed substantially as previously described for the mixer 44 (FIG. 2). The high pressure system 30A includes a control system 42A constructed substantially as previously described for control system 42 (FIG. 2). The high pressure system 30A also includes a hydrogen supply 38A, a natural gas supply 36A, and a heat exchanger 39A constructed substantially as previously described for hydrogen supply 38 (FIG. 2), natural gas supply 36 (FIG. 2) and heat exchanger 39 (FIG. 2). The high pressure system 30A also includes a hydrogen pressure regulator 32A substantially similar to the pressure regulator 32 (FIG. 2), which can be actively controlled by the control system 42A. The high pressure system 30A also includes choking devices 18A in the form of adjustable sonic nozzles that can be actively controlled by the control system 42A.

Partial Pressure Blending of Ideal Gases

Figure 8:
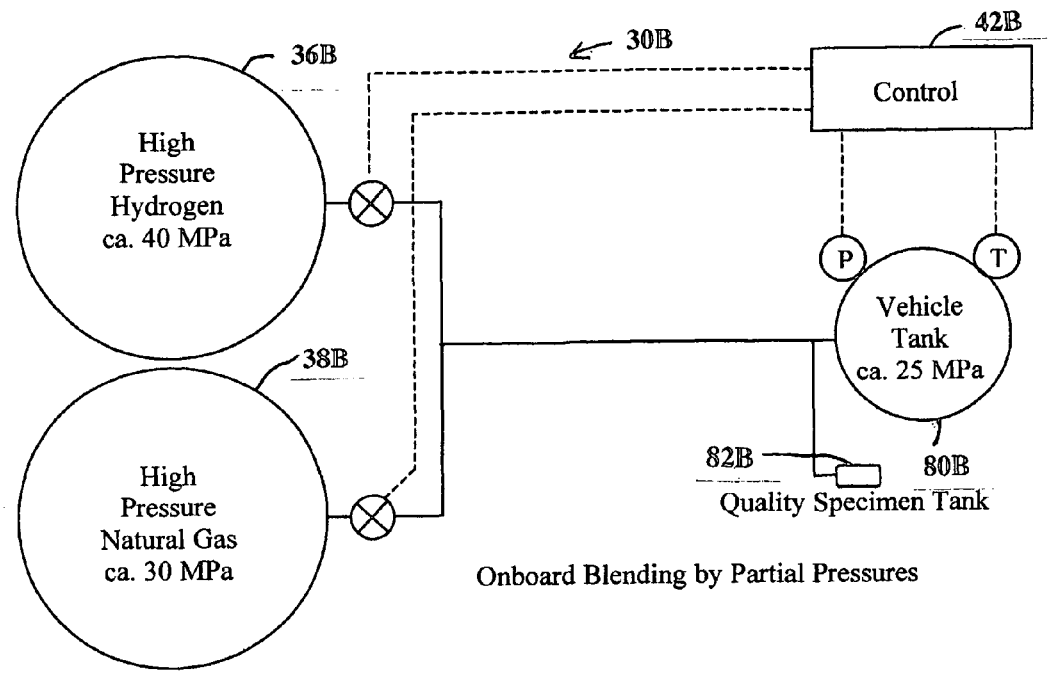
FIG. 8 is a schematic illustration of an alternate embodiment on board blending by partial pressures system.
Figure 9:
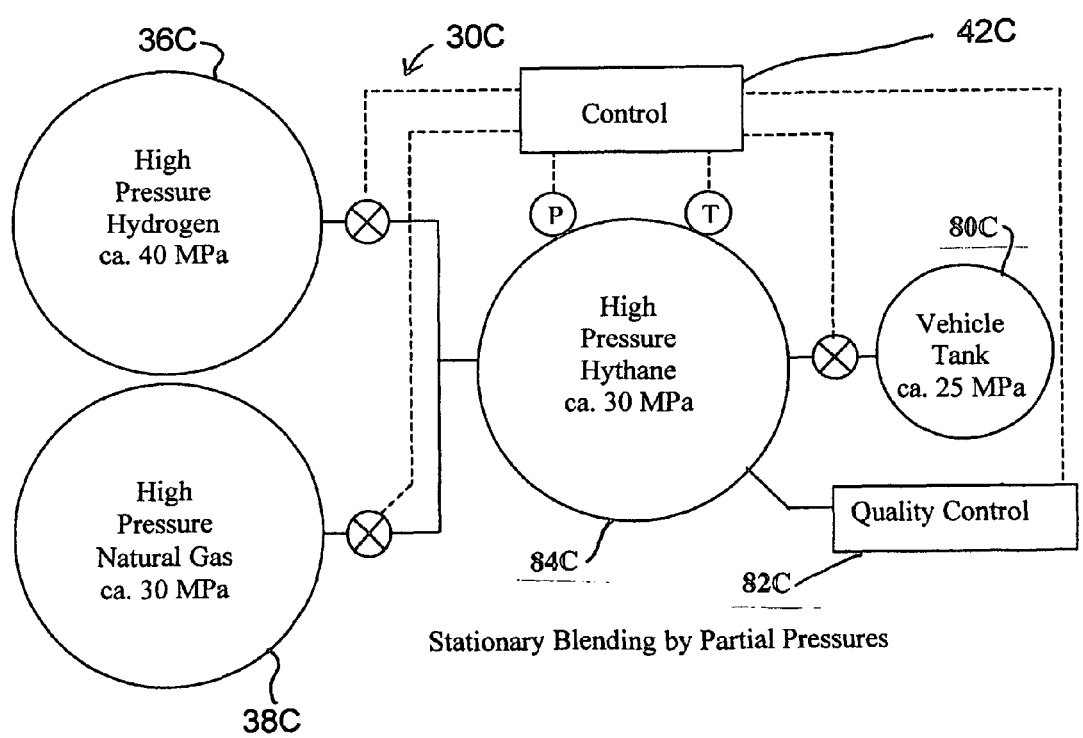
FIG. 9 is a schematic illustration of an alternate embodiment stationary blending by partial pressures system.
Figure 10:
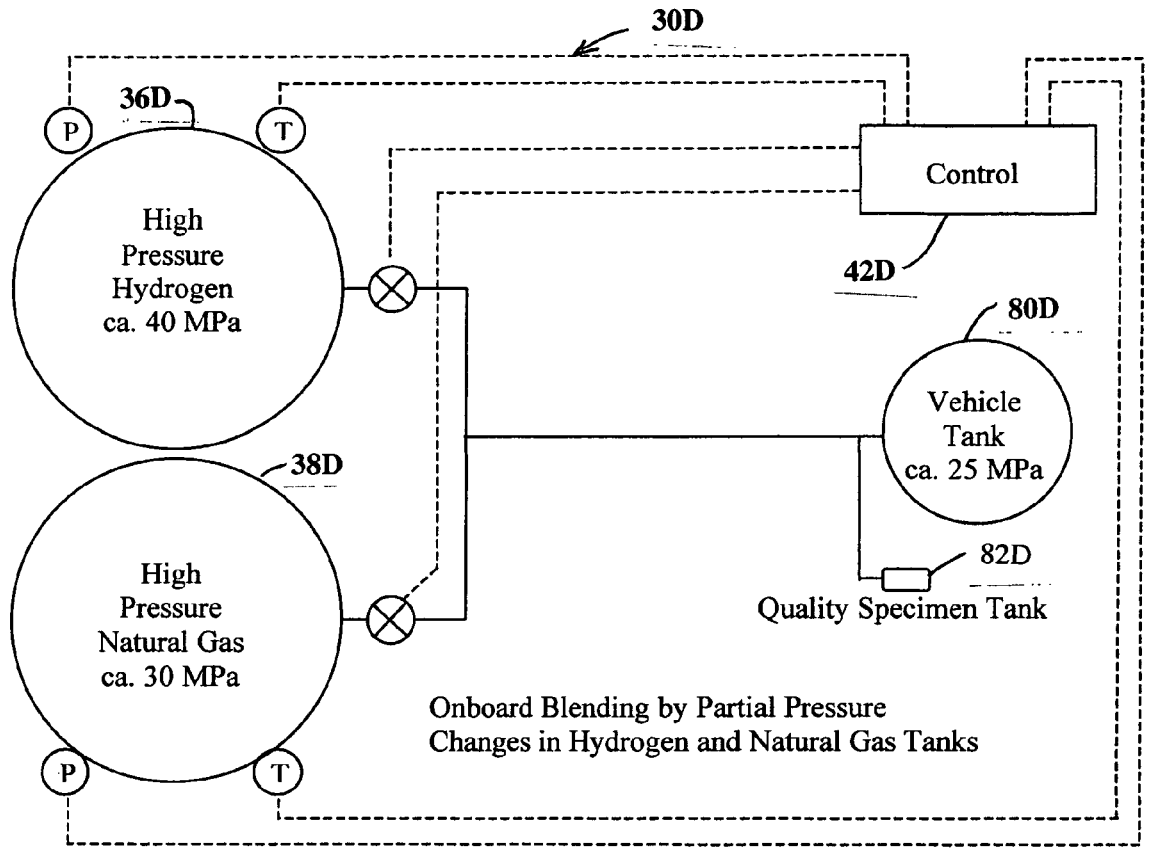
FIG. 10 is a schematic illustration of an alternate embodiment on board blending by partial pressures system by monitoring changes in stationary refueling receptacles.

Referring to FIGS. 8-10, alternate embodiment high pressure partial pressure blending systems are illustrated. In FIG. 8, a high pressure partial pressure system 30B includes a high pressure hydrogen supply 36B and a high pressure natural gas supply 38B. The system 30B also includes a control system 42B configured to control filling of a vehicle tank 80B using partial pressures as will be further described. The system 30B also includes a quality control system 82B in the form of a specimen tank for extracting and evaluating specimens of the blended gas.

In FIG. 9, a high pressure partial pressure system 30C includes a high pressure hydrogen supply 36C and a high pressure natural gas supply 38C. The system 30C also includes a control system 42C configured to control filling of a high pressure storage vessel 84C and then a vehicle tank 80C using partial pressures as will be further described. The system 30C also includes a quality control system 82B for extracting and evaluating specimens of the blended gas.

In FIG. 10, a high pressure partial pressure system 30D includes a high pressure hydrogen supply 36D and a high pressure natural gas supply 38D. The system 30D also includes a control system 42D configured to control filling of a vehicle tank 80D using partial pressures measured in the hydrogen supply 36D and the natural gas supply 38D. The system 30D also includes a quality control system 82D for extracting and evaluating specimens of the blended gas. In this embodiment all of the pressure measurements are made on the hydrogen supply 36D and the natural gas supply 38D, rather than on the vehicle tank 80B as in the system 30B (FIG. 8).

The systems 30B (FIG. 8), 30C (FIG. 9) and 30D (FIG. 10) can be controlled and operated as follows. For ideal gas mixtures, the concentration of each gas in the mixture is represented by its partial pressure. For example, if ideal gas A and ideal Gas B exist as a 50/50 mole fraction (AKA volume percent) mixture at a total pressure of 10 MPa, we may say that the partial pressure of A is 5 MPa and the partial pressure of B is 5 MPa. This ideal gas mixture can be prepared in an empty tank by filling it at constant temperature to 5 MPa with A, and further filling the tank at constant temperature with B until the total pressure of A plus B reaches 10 MPa.

For 1 mole (mol) of ideal gases $PV/RT=1$, where P is absolute pressure, V is volume, T is the absolute temperature and R is the "universal gas constant" in units consistent with P, V and T. In Standard International Units, P=pressure in Pa (Pascals), $m^3$=volume in cubic meters, T is the absolute temperature in Kelvins (K) and R=8.3145 (Pa·$m^3$)/(mol·K).

Suppose that our objective is to fill a 25 MPa tank with an ideal gas mixture having 20 parts A and 80 parts B. Suppose further that the tank initially contains 5 MPa of the same mixture. We would calculate the partial pressures as follows:

Initial Conditions:
Room Temperature
5 MPa Total Mixture Pressure
1 MPa Partial Pressure of A
4 MPa Partial Pressure of B
Final Conditions:
Room Temperature
25 MPa Total Mixture Pressure
5 MPa Partial Pressure of A
20 MPa Partial Pressure of B To bring the partial pressure of A from 1 MPa to 5 MPa we add 4 MPa of ideal gas A. This brings the total mixture pressure to 9 MPa. Even ideal gases get warm as they are compressed so we must wait until the tank returns to room temperature, adding A to maintain 9 MPa. The partial pressure of B remains at 4 MPa as we add A.

To bring the partial pressure of B from 4 MPa to 20 MPa we add 16 MPa of ideal gas B. Holding 25 MPa as the tank cools to room temperature brings the total mixture pressure from 9 MPa to 25 MPa. The partial pressure of A is 1+4=5 MPa. The partial pressure of B is 4+16=20 MPa. The objective has been accomplished.

Partial Pressure Blending of Real Gases

For 1 mole (mol) of a real gas, $PV/RT=Z \neq 1$. For many real gases at low pressures, $Z \approx 1$ is a fair approximation. This is not true at higher pressures, especially for the two gases of most interest for this patent application: hydrogen and methane.

Z affects the pressures applied to achieve the desired mole percent. The HYTHANE Co. partial pressure blending model takes account of variations in $Z_{mix}$ with pressure, temperature and concentrations of hydrogen in natural gas to arrive at the desired mole ratio of hydrogen in natural gas.

With Z as a variable in real gas mixtures, it is easier to count moles of each species taking Z into account. For a real gas mixture the total number of moles of gas in the tank is $$n_{mix} = P_{mix}/Z_{mix}(V/RT)$$

where P is the pressure, V is the volume of the tank in and T is the temperature of the tank and the subscript $_{mix}$ reminds us that the relationship applies to a gas mixture.

If the real gas is comprised of 1 mol of A for every 4 mols of B we can define a mole fraction, f, for each gas in the mixture.

$$f_A = 1/5 = 0.2$$

$$f_B = 4/5 = 0.8$$

Then, at the beginning of refueling $$n_{Ai} = (f_A P i_{mix}/Z_{mix}) \times (V/RT_i)$$

$$n_{Bi} = (f_B P i_{mix}/Z_{mix}) \times (V/RT_i)$$

where the subscript $_i$ identifies initial conditions.

This defines the number of moles of each gas in the tank before refueling.

The final condition after refueling has the same target of 1 mole of A for every 4 moles of B. The tank also has a rated capacity, stated in terms of "settled" pressure and temperature, e.g., 25 MPa @ 21° C. That corresponds to a fixed number of moles of each gas in the tank at the end of refueling. We can calculate that number by knowing $Z_{mix}$ for the mixture at that pressure and temperature.

$$n_{Af} = (f_A P_{settled}/Z_{mix}) \times (V/RT_{settled})$$

$$n_{Bf} = (f_B P_{settled}/Z_{mix}) \times (V/RT_{settled})$$

The actual pressure and temperature at the end of the refueling do not matter, within the absolute limits of the tank.

The differences $(n_{Af} - n_{Ai})$ and $(n_{Bf} - n_{Bi})$ are the numbers of moles of each gas to be added to fill the tank.

Measuring the Added Gas

Elsewhere in this patent application it is explained that choked flow through a pair of choking devices, such as sonic orifices or sonic nozzles can maintain a proportion between a flow of hydrogen and a flow of methane or natural gas. These choking devices may also be calibrated and used as flow meters. The downside of this is the need to maintain upstream pressure about 12% higher than the maximum tank pressure at the end of refueling. For a 25 MPa CNG refueling station, the maximum allowable pressure in the stationary tanks might be just over 30 MPa. That is not a large enough margin to complete a choked refueling to 25 MPa on a warm day. There is an additional problem that the source tanks cannot deliver any fuel without dropping pressure. One option is to use larger tanks with higher pressure ratings if we want to use choked flow to blend HYTHANE at high pressure.

Other types of flow meters are available (e.g., coriolis) but all such flow meters suffer from inaccuracies at the low end of the flow range near the end of the refueling process. All of them are subject to transient errors and all are expensive.

An inexpensive and accurate method of measuring the quantity of gas transferred is to monitor pressure and temperature changes in tanks whose volumes are known. This method is explained in Raman, et Al (ref 1) for pure hydrogen. For HYTHANE we need to measure P and T changes in the hydrogen source tanks and the natural gas source tanks.

$$n_{H2} = [P_{iH2}/Z_{iH2}(V_{H2\,Source}/RT_{iH2})] - [P_{fH2}/Z_{fH2}(V_{H2\,Source}/RT_{fH2})]$$

$$n_{NG} = [P_{iNG}/Z_{iNG}(V_{NG\,Source}/RT_{iNG})] - [P_{fNG}/Z_{fNG}(V_{NG\,Source}/RT_{fNG})]$$

We must add no gas to the source tanks during refueling unless we know exactly how much was added.

High Pressure HYTHANE Cascade

The methods disclosed in this patent application for filling vehicle tanks could also be applied to filling a high pressure cascade for vehicle refueling. For example, a cascade of storage tanks can be located at a refueling station as described in previously incorporated U.S. application Ser. No. 11/348,193. At least the final stage of the cascade can be kept at a significantly higher pressure than the maximum pressure of a vehicle fuel tank in order to dispense fuel quickly from the dispensing system into the vehicle fuel tank.

Hydrogen sources typically have peak pressures in excess of 40 MPa for filling 35 MPa hydrogen vehicle tanks. A premixed HYTHANE cascade could be used to refuel 25 MPa HYTHANE vehicle tanks. The HYTHANE cascade could be refilled first, by adding the required amount of CNG at up to 30 MPa and second, by adding the required amount hydrogen at up to 40 MPa. The downside is the cost of the 40 MPa HYTHANE cascade.

For an idealized example, say the HYTHANE cascade pressure has dropped down to 25 MPa after filling a vehicle. Before the next vehicle is filled, CNG is added from its source at 30 MPa until the HYTHANE cascade pressure rises 4 MPa to 29 MPa. Then, hydrogen is added from its source at 40 MPa until the HYTHANE cascade pressure rises another 1 MPa and settles at 30 MPa for the next vehicle fill cycle. The addition of 4 MPa of CNG and 10 MPa of hydrogen give approximately the 80% CNG:20% H2 mole ratio target for HYTHANE. Of course, the actual cascade refilling process would use real gas properties and known HYTHANE cascade tank temperatures to make the process accurate for real (non-ideal) gases, with actual gas conditions taken into account. Because this method only uses pressure and temperature measurements from the HYTHANE cascade, it allows uninterrupted compression into the CNG and hydrogen sources. However, the HYTHANE cascade refilling cycle must finish before any vehicle fill. Any subsequent delays between vehicle fills should be minimal, though, because the separate cascade banks allow the cascade refilling process to be done in small, separate stages for each bank, as well—the second cascade bank can be refilled while the first cascade bank is refueling the vehicle, and so on.

Summary of Embodiments

Low-pressure blending with choking devices (e.g., sonic orifices/nozzles) upstream of compressor for HYTHANE cascade storage (for vehicle filling).

High pressure refilling of vehicle tanks using partial pressure and tank temperature data for each, separate, CNG or hydrogen fill step:
  1a. Known vehicle tank temperature(s)—along with partial pressures and real gas properties, allows calculation and confirmation of proper blend ratio.
  1b. Known vehicle tank temperature(s) and volume(s)—along with partial pressures and real gas properties, allows calculation and confirmation of proper blend ratio and vehicle fuel fill quantity (metering).
  2a. Known CNG and H2 source tank temperature(s)—along with pressure changes and real gas properties, allows calculation and confirmation of proper blend ratio. No compression into sources allowed during vehicle filling process.
  2b. Known CNG and H2 source tank temperature(s) and volume(s)—along with pressure changes and real gas properties, allows calculation and confirmation of proper blend ratio and vehicle fuel fill quantity (metering). No compression into sources allowed during vehicle filling process.

High pressure refilling of a separate HYTHANE storage cascade, which is subsequently used to refuel vehicles, using partial pressure and tank temperature data for each, separate, CNG or hydrogen fill step:
  1a. Known HYTHANE storage cascade tank temperature(s): along with pressure changes and real gas properties, allows calculation and confirmation of proper blend ratio. Compression into sources is allowed during HYTHANE cascade filling process. Vehicle refueling is not allowed during HYTHANE cascade filling process.
  1b. Known CNG and H2 storage cascade tank temperature(s) and volume(s): along with pressure changes and real gas properties, allows calculation and confirmation of proper blend ratio and vehicle fuel fill quantity (metering). Compression into sources is allowed during HYTHANE cascade filling process. Vehicle refueling is not allowed during HYTHANE cascade filling process.

High pressure blending and vehicle refueling with sonic nozzles:

Requires hydrogen supply pressure regulation which tracks with the natural gas supply pressure. To compensate for compressibility changes, this method also requires either: 1) additional, active hydrogen pressure control; or 2) active hydrogen nozzle throat area control. LCNG supply-pumped and vaporized liquid natural gas may require 14% higher pump pressure. CNG supply may require more than 14% higher pressure and/or additional storage volume. With upstream pressure and temperature data, sonic nozzles provide fuel fill metering, with no additional flow meters or totalizers required in the vehicle fuel dispenser.

High pressure blending and HYTHANE storage cascade refilling with sonic nozzles:

Requires hydrogen supply pressure regulation which tracks with the natural gas supply pressure. To compensate for compressibility changes, this method also requires either: 1) additional, active hydrogen pressure control; or 2) active hydrogen nozzle throat area control. LCNG supply may require at least 34% higher pump pressure. CNG supply may require more than 34% higher pressure and additional storage volume. No vehicle fuel fill metering provided by the nozzles.

While a number of exemplary aspects and embodiments have been discussed above, those of skill in the art will recognize certain modifications, permutations, additions and subcombinations thereof. It is therefore intended that the following appended claims and claims hereafter introduced are interpreted to include all such modifications, permutations, additions and sub-combinations as are within their true spirit and scope.

What is claimed is:

1. A gas blending and compressing system comprising:
   a blender comprising a first inlet chamber configured to receive a first gas, a second inlet chamber configured to receive a second gas, a blending chamber in flow communication with the first inlet chamber and the second inlet chamber configured to blend the first gas and the second gas into a blended gas, a first choking device in flow communication with the first inlet chamber and the blending chamber and a second choking device in flow communication with the second inlet chamber and the blending chamber configured to achieve a blend ratio for the blended gas;
   a compressor in flow communication with the blender configured to compress the blended gas to a pressure;
   a storage vessel in flow communication with the compressor configured to store the blended gas; and
   a control system configured to sense operational parameters of the blender and the compressor, to sense one or more properties of the blended gas, to control the blender and the compressor to maintain the blend ratio and a substantially constant flow rate through the compressor;
   the control system comprising a sensor configured to sense an intake pressure of the blended gas to the compressor, a controller in signal communication with the sensor configured to control the compressor, a feedback regulator in signal communication with the sensor configured to provide a flow of the blended gas from the storage vessel to the compressor, and a processing unit in flow communication with the compressor configured to test the blended gas from the blender and to signal the controller to shut down the blender and the compressor if the blended gas does not meet standards for the blend ratio.

2. The system of claim 1 wherein the processing unit is also configured to be manually operated by a user to override the controller.

3. The system of claim 1 wherein the first choking device and the second choking device comprise adjustable choking devices in signal communication with the controller, and the controller is configured to control the adjustable choking devices to maintain the blend ratio.

4. The system of claim 3 wherein the first choking device and the second choking device comprise adjustable sonic nozzles, or metering valves.

5. The system of claim 1 wherein the controller comprises an element selected from the group consisting of microprocessors, dynamic random access memories, static random access memories and application specific integrated circuits.

6. The system of claim 1 further comprising a heat exchanger configured to regulate and substantially equalize a temperature of the first gas and the second gas supplied to the blender.

7. The system of claim 1 wherein the control system includes a mixer having a mixing chamber with an inlet configured to receive the blended gas, and an outlet configured to output the blended and mixed gas to the compressor.

8. The system of claim 7 wherein the mixing chamber includes a plurality of gas agitating elements configured to facilitate mixing of the blended gas.

9. The system of claim 1 wherein the first gas comprises hydrogen and the second gas comprises methane or natural gas.

10. A gas blending system comprising:
    a blender comprising a first inlet chamber configured to receive a first gas, a second inlet chamber configured to receive a second gas, a blending chamber in flow communication with the first inlet chamber and the second inlet chamber configured to blend the first gas and the second gas into a blended gas a first adjustable choking device in flow communication with the first inlet chamber and the blending chamber, and a second adjustable choking device in flow communication with the second inlet chamber and the blending chamber;
    a compressor in flow communication with the blender configured to compress the blended gas to a pressure;
    a storage vessel in flow communication with the compressor configured to store the blended gas; and
    a control system comprising a sensor configured to sense an intake pressure of the blended gas to the compressor, a controller in signal communication with the sensor configured to control the first adjustable choking device, the second adjustable choking device and the compressor, and a feedback regulator in signal communication with the sensor configured to provide a flow of the blended gas from the storage vessel to the compressor;
    the control system configured to maintain the blend ratio of the blended gas, to supply the compressor with a substantially constant flow of the blended gas with the blend ratio at a minimum flow rate of the compressor, and to maintain the pressure above a minimum level and below a maximum level.

11. The system of claim 10 wherein the first gas comprises hydrogen and the second gas comprises methane or natural gas.

12. The system of claim 10 further comprising a processing unit in flow communication with the compressor configured to test the blended gas from the blender and to signal the controller to shut down the blender and the compressor if the blended gas does not meet a standards for the blend ratio.

13. The system of claim 10 wherein the first adjustable choking device and the second adjustable choking device comprise adjustable sonic nozzles.

14. The system of claim 10 wherein the first adjustable choking device and the second adjustable choking device comprise adjustable metering valves.

15. The system of claim 10 further comprising a mixer in flow communication with the blender having a plurality of gas agitating elements configured to mix the blended gas.

* * * * *